United States Patent
Ray et al.

(10) Patent No.: US 11,402,244 B2
(45) Date of Patent: Aug. 2, 2022

(54) AUTOMATIC CALIBRATION OF A MEASURING CIRCUIT

(71) Applicant: BEAMEX OY AB, Pietarsaari (FI)

(72) Inventors: Mathias Ray, Uusikaarlepyy (FI); Anders Nyman, Luoto (FI); Heikki Laurila, Pietarssaari (FI)

(73) Assignee: BEAMEX OY AB, Pietarsaari (FI)

( * ) Notice: Subject to any disclaimer, the term of this patent is extended or adjusted under 35 U.S.C. 154(b) by 67 days.

(21) Appl. No.: 16/496,116

(22) PCT Filed: Mar. 20, 2018

(86) PCT No.: PCT/FI2018/050205
§ 371 (c)(1),
(2) Date: Sep. 20, 2019

(87) PCT Pub. No.: WO2018/172611
PCT Pub. Date: Sep. 27, 2018

(65) Prior Publication Data
US 2020/0096371 A1   Mar. 26, 2020

(30) Foreign Application Priority Data

Mar. 20, 2017 (FI) .................................. 20175252

(51) Int. Cl.
*G01D 18/00* (2006.01)
(52) U.S. Cl.
CPC .................. *G01D 18/008* (2013.01)
(58) Field of Classification Search
CPC .................................. G01D 18/008
See application file for complete search history.

(56) References Cited

U.S. PATENT DOCUMENTS 3,535,637 A * 10/1970 Goransson .............. B08B 15/00
324/130
4,403,297 A    9/1983 Tivy
(Continued)

FOREIGN PATENT DOCUMENTS

JP    2002123312 A    4/2002
JP    2002287815 A    10/2002
(Continued)

OTHER PUBLICATIONS

International Search Report and Written Opinion for PCT/FI2018/050205 dated Jul. 16, 2018.
Finnish Search Report for FI 20175252 dated Oct. 10, 2017.

*Primary Examiner* — Alexander Satanovsky
*Assistant Examiner* — Lyudmila Zaykova-Feldman
(74) *Attorney, Agent, or Firm* — Thomas Horstemeyer, LLP (57) ABSTRACT

The present invention describes an automatic calibration method for a measuring circuit for example in an industrial automation or handling process, where only one person is needed to manage the entire procedure. The components are a calibrator (11) which the worker in the field has with him, which can be connected to the starting end of the measuring circuit in order to give an impulse. The quantity to be measured/calibrated has not been limited. The measurement result is seen at the end of the measuring circuit on a screen of the control room, i.e. DCS (13). Depending on the alternative embodiment, the measured numerical value can be steered either to a dedicated server (14) over an OPC connection, and onwards wirelessly or via Ethernet back to the calibrator (11). One alternative is to use a smart device (16) which the worker has, with suitable applications, to which the measured data can be sent over a network, and the data is also presentable in a user-friendly manner in such an application. Thus, the data can be sent onwards to the (Continued)

calibrator (11) in the field over a BT connection. A third alternative is a direct sending of the measurement result from the control room (13) to the calibrator (11), whereby a 3G/4G/5G network, a Wifi, Bluetooth or Ethernet connection can be used for sending the data. A delay module (15) manages mutual temporal synchronization of the data i.e. numerical pairs. The data can be stored in a spreadsheet, matrix or graphic form in a desired place, such as in the calibrator's (11) own memory or in a desired server for example in a cloud.

17 Claims, 3 Drawing Sheets

(56) References Cited

U.S. PATENT DOCUMENTS

| | | | | |
|---|---|---|---|---|
| 4,805,021 A | * | 2/1989 | Harlos | H03H 11/26 |
| | | | | 348/536 |
| 5,552,793 A | * | 9/1996 | McLeod | G01S 7/4008 |
| | | | | 342/204 |
| 9,640,244 B1 | * | 5/2017 | Jeter | G11C 29/028 |
| 9,906,235 B2 | * | 2/2018 | Kris | H03M 1/1009 |
| 2002/0013133 A1 | * | 1/2002 | Lam | H01Q 21/06 |
| | | | | 455/137 |
| 2003/0154044 A1 | * | 8/2003 | Lundstedt | G01N 35/00871 |
| | | | | 702/104 |
| 2004/0047263 A1 | * | 3/2004 | Xang | G11B 7/1267 |
| | | | | 369/53.26 |
| 2005/0083197 A1 | | 4/2005 | Glenn et al. | |
| 2010/0005336 A1 | * | 1/2010 | Jordan | H04L 69/26 |
| | | | | 714/4.1 |
| 2012/0200435 A1 | * | 8/2012 | Ngo | H04B 17/13 |
| | | | | 341/61 |
| 2012/0303324 A1 | * | 11/2012 | Nakatani | G05B 19/058 |
| | | | | 702/185 |
| 2014/0241082 A1 | * | 8/2014 | Tam | G06F 13/1689 |
| | | | | 365/194 |
| 2015/0276432 A1 | | 10/2015 | Repyevsky | |
| 2017/0272090 A1 | * | 9/2017 | Wei | G01R 31/28 |

FOREIGN PATENT DOCUMENTS

| | | |
|---|---|---|
| JP | 2003028675 A | 1/2003 |
| JP | 2014081708 A | 5/2014 |
| WO | 03/010624 A2 | 2/2003 |

* cited by examiner

AUTOMATIC CALIBRATION OF A MEASURING CIRCUIT

CROSS-REFERENCE TO RELATED APPLICATIONS

This application is the 35 U.S.C. 0.371 national stage application of PCT Application No. PCT/FI2018/050205, filed Mar. 20, 2018, where the PCT claims the priority to and benefit of Finnish Patent Application No. 20175252, filed Mar. 20, 2017, both of which are herein incorporated by reference in their entireties.

FIELD OF THE INVENTION

The present invention relates to various calibrations made in industrial devices and processes.

BACKGROUND OF THE INVENTION

Factories can have several measuring points connected to automated processes, and the quantities to be measured can be very different, anything from pressure measurements to temperatures, to measurements of electric quantities, and for example flow rates of materials. When it is desired to calibrate some element or process part, this is traditionally done in the field with the aid of a calibrator. When on the other hand it is desired to find out the accuracy of the operation of all the parts in an entire measuring circuit, prior art has included a worker going into the field with a calibrator, whereby the calibrator can be connected to a measurement circuit's input connector, and thus an impulse can be given to the measuring circuit's input point, whereby a monitor in a control room functions as a presenter of results at the end of the measuring circuit. The measuring circuit chain is formed from a sensor, possible amplifying elements, transfer lines, a transmitter and possible other devices and elements, such as circuit boards. The starting end of the measuring circuit can be a pressure, temperature or other sensor measuring the process, and the control room can be situated physically very far from this starting end. All the measurements made in the processes in the factory can be monitored centrally in the control room, and for example also pictures or video images of desired parts of the process taken with surveillance cameras.

A Distributed Control System (DCS), or a centralized control system, can be used for controlling devices and process stages in the field.

Calibration of an entire measuring circuit involves checking if the circuit measures a desired quantity correctly. Typically, the prior art requires two workers, one of which has gone into the field and the other of which is needed for monitoring the information visible in the control room. One of the workers has thus gone into the field with a precise reference measuring device, i.e. a calibrator, and he has connected the calibrator to a desired input point in the starting end of the measuring circuit. The calibrator gives its own impulse to the measuring circuit, and this impulse is visible on the calibrator screen. The second person works in the control room, and he sees on the control room monitor the measurement result given by the measuring circuit in question. Both the input from the calibrator and the measurement result visible on the control room monitor need to be recorded, and this is in practice done so that the information is given to the other worker by phone, and he writes both results down manually.

Publication WO 03/010624 discloses on-site analysis system with central processor and method of analysing. The system comprises a group of sensors (i.e. data acquisition devices), a communication network, and a central processor. Multivariate calibration models are loaded in the central processor, which models predict values for various properties of interest. The calibration models compensate for variations in a set of measurement conditions. Thus, the calibration models can compensate for instrument-specific calibration transfer. Measurement results generated by the central processor can be transmitted to an output device of a user interface.

Publication JP 2014081708 discloses a standard instrument-calibration test system, where a test terminal inputs a simulated signal into a detector in the plant. A controller collects the measured value from the detector where the detector is selected according to a control of a central control room. The central control room displays the measured value in a display to a monitoring person in the central control room. By comparing the displayed measurement result and the input simulated signal, the human examiner in the control room can verify whether the detector and the I/O device are operating normally. The measured values can also be recorded in the control room.

Publication JP 2003028675 discloses a measurement instrument system for manual use, where the user carries a portable computer unit and a head set. There is a surface property measuring device, which sends measurement data to a fixed host computer, which in turn sends the data to the portable computer unit via a radio. The user wears the head set with a display device, with such display formed as goggles covering at least partly the user's visual field of sight. The user is able to simultaneously observe the measurement area of the actual surface, and the display device showing information related to the measurement, thus improving the measurement work efficiency.

The prior art manner is complicated, and requires, in addition to the coordinated work of two workers, also surplus communication via phone, which makes the calibration of the measuring circuit slow and also susceptible to possible mistakes, because the results are recorded manually. The current measuring manner has possibilities for a more automated process.

SUMMARY OF THE INVENTION

The present invention presents a method and a system for automatic calibration of a measuring circuit. The method can in practice be realized for example with a process calibrator, which is in contact with a control room system. The steps of the method can be realized for example by running a desired computer program on a dedicated processor or controller. This can thus be realized in a computerized manner, comprising a dedicated server and, if necessary, one or more PCs. The present invention makes it possible that calibration of a measuring circuit can be done completely by just one person, instead of the two previously required.

The invention can be summarized as follows. The present invention presents a method for calibrating a measuring circuit automatically in a process to be measured, which method comprises the steps of:

connecting the calibrator to the starting point of a measuring circuit in the process to be measured feeding a desired impulse from the calibrator into the starting point of the measuring circuit reading the measurement result given by the measuring circuit at the ending point of the measuring circuit in the control room.

As characteristics of the method it also comprises the following steps of:
sending the read measurement result digitally back to the calibrator and
storing both the impulse and the read measurement result automatically in a desired place.

In one embodiment of the present invention the desired place for storing is a calibrator, a dedicated server or an external server situated in a cloud.

In one embodiment of the present invention the method further comprises the following step of:
delaying the storing of the impulse, so that the sent measurement result can be stored at the same time as the impulse, and connected as a numerical value pair.

In one embodiment of the present invention the method further comprises the following steps of:
feeding impulses at predetermined steps, converted as a function of time
measuring corresponding measurement results and determining the total delay of the measuring circuit from the variations in the measurement results as a function of time.

In one embodiment of the present invention the method further comprises the following steps of:
sending the read measurement result via an OPC connection to a dedicated server and
sending the read measurement result from the dedicated server to a calibrator by means of a Wifi, Bluetooth, 3G, 4G, 5G or Ethernet connection.

In one embodiment of the present invention the method further comprises the following steps of:
sending the read measurement result via radio to a mobile phone or smart device and
sending the read measurement result from the mobile phone or smart device to a calibrator via a Bluetooth connection.

In one embodiment of the present invention the method further comprises the following step of:
sending the read measurement result directly by means of a Wifi, Bluetooth, 3G, 4G, 5G or Ethernet connection from the control room to the calibrator.

In one embodiment of the present invention the method further comprises the following step of:
connecting the calibrator and control room to a network, which can be the internet.

In one embodiment of the present invention the mobile phone or smart device comprises a dedicated application for managing connections and data transfer.

In one embodiment of the present invention the method further comprises the following steps of:
repeating the measurement through a desired measuring area and
storing the results of each measuring point in the measuring area as numerical pairs in a desired place.

The inventive idea of the present invention further comprises a system for calibrating a measuring circuit automatically in a process to be measured, which system comprises:
a calibrator, which is connected to the starting point of the measuring circuit of a process to be measured, where the calibrator comprises a controller
an impulse signal, which is arranged to be fed from the calibrator to the starting point of the measuring circuit as controlled by the controller
an end point of the measuring circuit in a control room, where the measurement result given by the measuring circuit can be read.

The system is characterized in that it further comprises:
transmission means for sending the read measurement result digitally back to the calibrator and
storing means, which are arranged to store both the impulse and the read measurement result automatically in a desired place.

In one embodiment of the present invention the desired place for storing is a calibrator, a dedicated server or an external server situated in the cloud.

In one embodiment of the present invention the system further comprises:
a delay module for delaying the storing of the impulse, so that the sent measurement result can be stored at the same time as the impulse, and connected as a numerical value pair.

In one embodiment of the present invention the system further comprises:
a controller, which is arranged to feed impulse signals at predetermined steps, as converted to a function of time
a control room, where a group of measuring results corresponding to impulse signals is read and
the controller is arranged to determine the total delay of the measuring circuit from the variations in the measurement results as a function of time.

In one embodiment of the present invention the system further comprises:
a dedicated server, to which the read measurement result is sent via an OPC connection and additionally
the dedicated server is arranged to send the read measurement result to a calibrator by means of a Wifi, Bluetooth, 3G, 4G, 5G or Ethernet connection.

In one embodiment of the present invention the system further comprises:
a mobile phone or smart device, to which the read measurement result is sent via radio, and additionally
the mobile phone or smart device is arranged to send the read measurement result to the calibrator via a Bluetooth connection.

In one embodiment of the present invention the system further comprises:
said control room, which is arranged to send the read measurement result directly to a calibrator by means of a Wifi, Bluetooth, 3G, 4G, 5G or Ethernet connection.

In one embodiment of the present invention the system further comprises:
a network connection for connecting the calibrator and control room to a network, which can be the internet.

In one embodiment of the present invention the mobile phone or smart device comprises a dedicated application for managing connections and data transfer.

In one embodiment of the present invention the system is further arranged to:
repeat the measurement through a desired measuring area and
store the results of each measuring point in the measuring area as numerical pairs in a desired place.

The inventive idea of the present invention further comprises a computer program for calibrating a measuring circuit automatically in a process to be measured, which computer program comprises a program code, which can be run in a processor, which computer program is arranged to perform the following steps when run in the processor:
feeding a desired impulse from the calibrator into the starting point of the measuring circuit after the calibrator has manually been connected to the starting point of the measuring circuit in the process to be measured reading the measurement result given by the measuring circuit at the end point of the measuring circuit in the control room.

The computer program is characterized in that it is further arranged to perform the following steps:

sending the read measurement result digitally back to the calibrator and storing both the impulse and the read measurement result automatically in a desired place.

DETAILED DESCRIPTION OF THE INVENTION

The present invention presents a solution to calibrating an entire measuring circuit, so that it can be done by a single person instead of the two people previously required. The process to be measured can be any measuring circuit, where the location of the impulse feeding and the place where the measurement result is read are in physically different places. An example of such a case is a factory or an automated process, which is controlled centrally from a control room. The server or servers themselves, through which the control of the process is handled, can be situated in the control room or separately, for example as a cloud service. The quantity to be measured does not matter in this invention. The quantity to be measured can for example be temperature, pressure, some electric quantity such as electric current, voltage, power or frequency, RPM, acceleration or flow rate.

Figure 1:
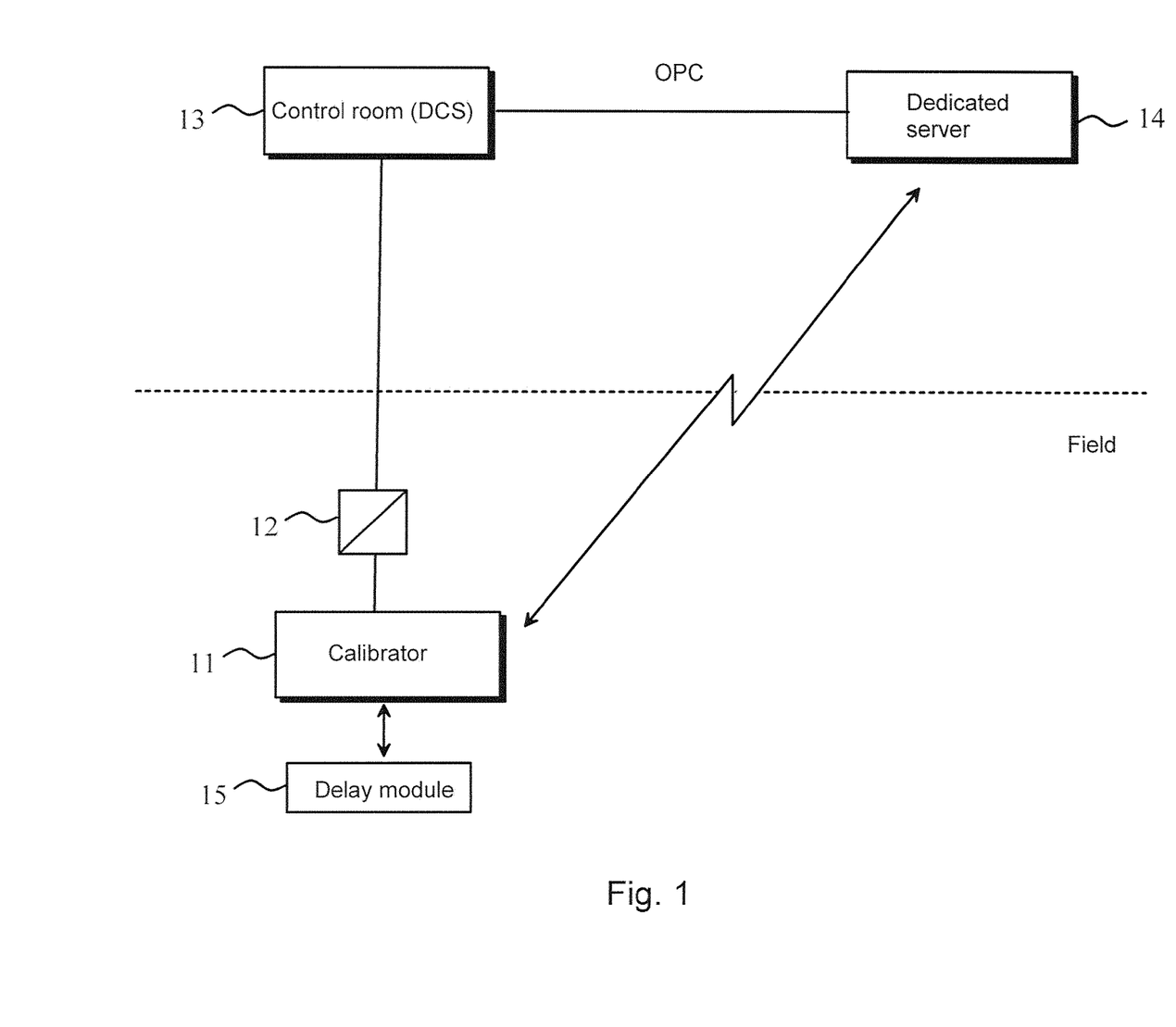
FIG. 1 shows the hardware arrangement according to the invention in its first alternative embodiment, which includes a dedicated server.

FIG. 1 shows the basic elements of the present invention and the data transmission principles for the impulse and measured signal. A basic principle is that only one worker is needed for the measuring method of the invention, and he can go directly into the field. The person needs a calibrator 11, which is a manually used portable device. First the worker connects the calibrator 11 to a desired place in the manufacturing or handling process, which relates to the quantity to be measured. It can be the fed current, voltage or control signal for the desired quantity. The calibrator naturally measures this transmission itself, so it can be certain that the output signal is correct and desired. It can be thought that the calibrator 11 measures the input given to the transmitter 12, whereby it is precisely known what should be sent onwards from the transmitter 12.

The outlet of the measuring line in question is on the other hand situated in a control room 13 (DCS=Distributed Control System), i.e. the measurement result of the desired quantity can be shown on a control room monitor. Physically the distance between the calibrator's connection point and the outlet point of the control room can even be several hundreds of meters and the operating principle of the invention is not dependent on the length of this physical distance. There can of course also be other elements on the measuring line, such as for example amplification or filtering, but these voluntary additional elements have been left out of the FIG. 1 for the sake of simplicity.

In the embodiment example of FIG. 1 the output of the measuring circuit read in the control room 13 can be sent for example via a so-called OPC connection ("OLE for Process Control"; OLE="Object Linking and Embedding") to the dedicated server 14. Another alternative is to connect the dedicated server 14 to the apparatus of the control room 13 (DCS), whereby the dedicated server 14 is connected to the control room system via an OPC connection. The dedicated server 14 can be physically situated in the control room space, or it can also physically be in a completely other space or for example be accessible via an internet connection as a server in a cloud. The dedicated server 14 has in use a software, with the aid of which the measurement data can be stored and also further be sent onwards.

When the measured data has been received to the dedicated server 14, it is sent onwards "back" to the calibrator 11 in the field. The connection can be wireless or wired. Example of possible manners of connection between the dedicated server 14 and the calibrator 11 in the field are a WiFi connection, a wireless connection arranged via a 4G network, an Ethernet connection or some other connection, such as a 3G, future 5G or for example Bluetooth connection. The calibrator 11 can be connected to an internal network comprising the process, or if needed to the internet. When the measurement result from the DCS is sent from the dedicated server 14, and received in the calibrator 11, the output of the transmitter 12 is reset to the calibrator's 11 input signal, from where the calibrator can store it in its memory. Because the calibrator can be connected to a network, the data can be stored also in another server or in a database situated in a cloud service. If the calibrator 11 stores in its own memory the result measured by the control room 13 and sent by the dedicated server 14, the calibrator can store a "measuring circuit's input signal—measurement result" pair related to the same measuring. In this situation it must still be made sure that delays caused by different elements in the measuring circuit, such as delays related to times passed in the signal transmission parts and passage times of the signal, are taken into account, when impulses and measurement results are combined as corresponding pairs. A delay module 15 can be taken into use in the calibrator's software, which delays the impulse signal given by the calibrator, until the corresponding measuring signal, which has run through the entire measuring circuit, arrives at the calibrator. Thereafter both the corresponding signal values can be stored for example in a two-column data spreadsheet, or in another type of database in a desired place, for example in the calibrator's own memory.

The entire above-mentioned series of operations can be done in the presence of and as performed by only one person, namely by the calibrator user, and it is even possible to automate the operation so that when the calibrator is connected to the input point and switched on, the calibrator can do the described operations independently and fully automatically.

Figure 2:
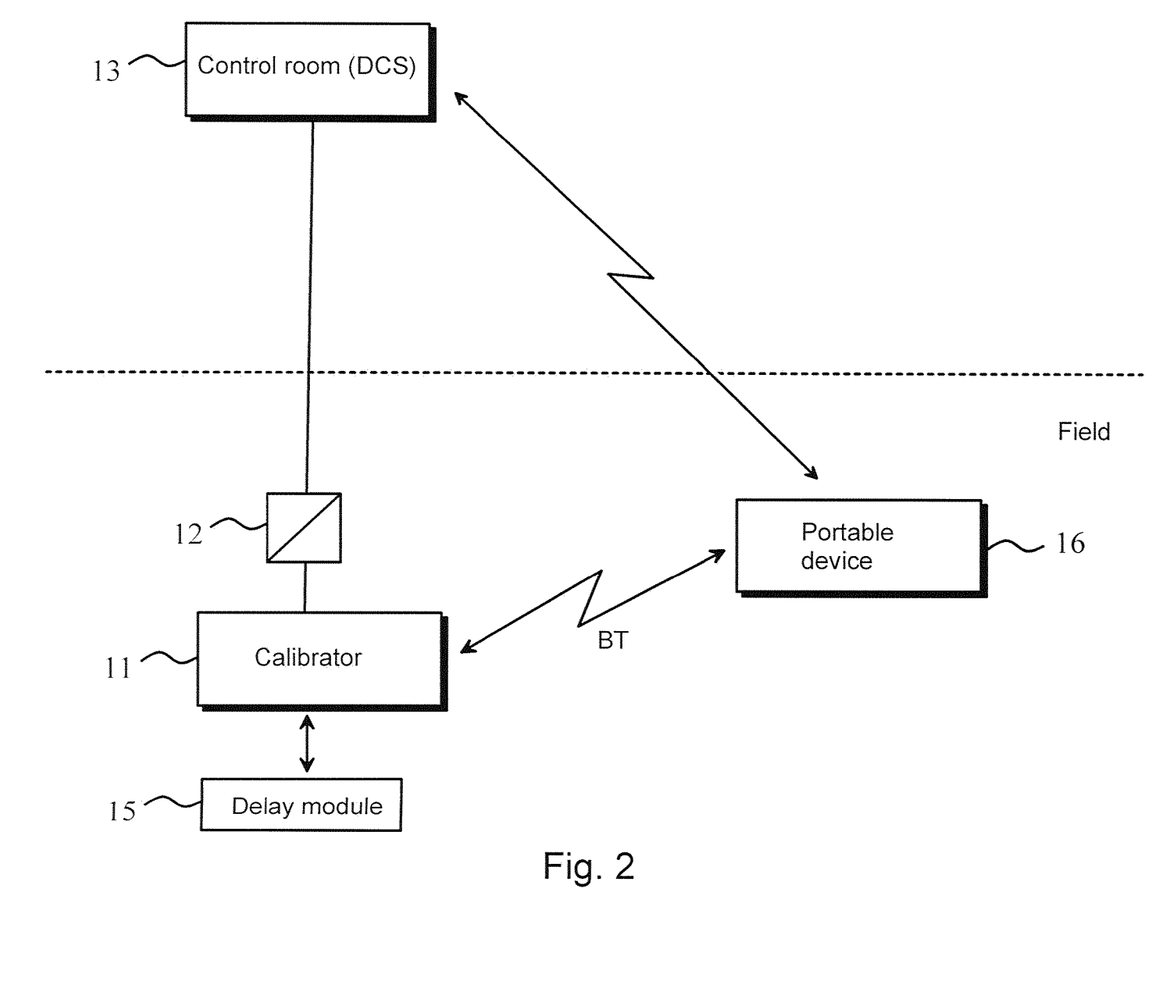
FIG. 2 shows the hardware arrangement in the second alternative embodiment of the invention, which includes a portable device

FIG. 2 on the other hand shows a second example of a system used by the invention for automatic calibration of a measuring circuit. This system is partly the same as the system of FIG. 1, but the dedicated server 14 has been replaced with a portable device 16, which can be used by the person in the field. The portable device 16 can be a smart phone, a tablet, or a laptop computer.

The basic principle of the impulse given by the calibrator to the measuring circuit, its own measuring in the calibrator 11 and the transmission via a transmitter 12 onwards to the measuring circuit, functions in the same way as was described above in connection with FIG. 1. The signal coming via the measuring circuit and sent by the transmitter 12 is received in the control room (DCS) 13, and it can be read from the control room monitor when needed. In this stage of the invention the data needs to be returned back to the field, but a dedicated server is not needed in this example. Instead the calibrator user in the field has in his use a portable device 16, which is connected to a network, the signal strength of which is sufficient in the calibrator use location. In one embodiment the portable device 16 is in direct contact with the control room 13 via an OPC connection. A dedicated application can be installed in the portable device 16, which application can in the case of a smart phone be a so-called app, i.e. a smart phone application for calibration data. The measurement result received from the measuring circuit can now be sent from the control room 13, and it is sent over a wireless network to the portable device 16. Both the forming of a connection between two devices, it being switched on, and the receiving of data are seen directly in the calibration application, which is installed in the portable device 16.

The received data can in turn be sent from the portable device 16 for example via a Bluetooth local connection onwards to the calibrator 11. With the aid of the delay module 15 the passage time of the data through the measuring circuit can be compensated for, and the impulses and the measurement results corresponding to them can be stored as corresponding measuring pairs for example in a data spreadsheet. If necessary, the measuring pairs can of course be shown also on the calibrator's 11 screen. Both the impulse and the read measurement result (which has passed through the measuring circuit) are finally stored in a desired place, such as in the calibrator's 11 own memory, in a cloud or in the control room 13 server.

Figure 3:
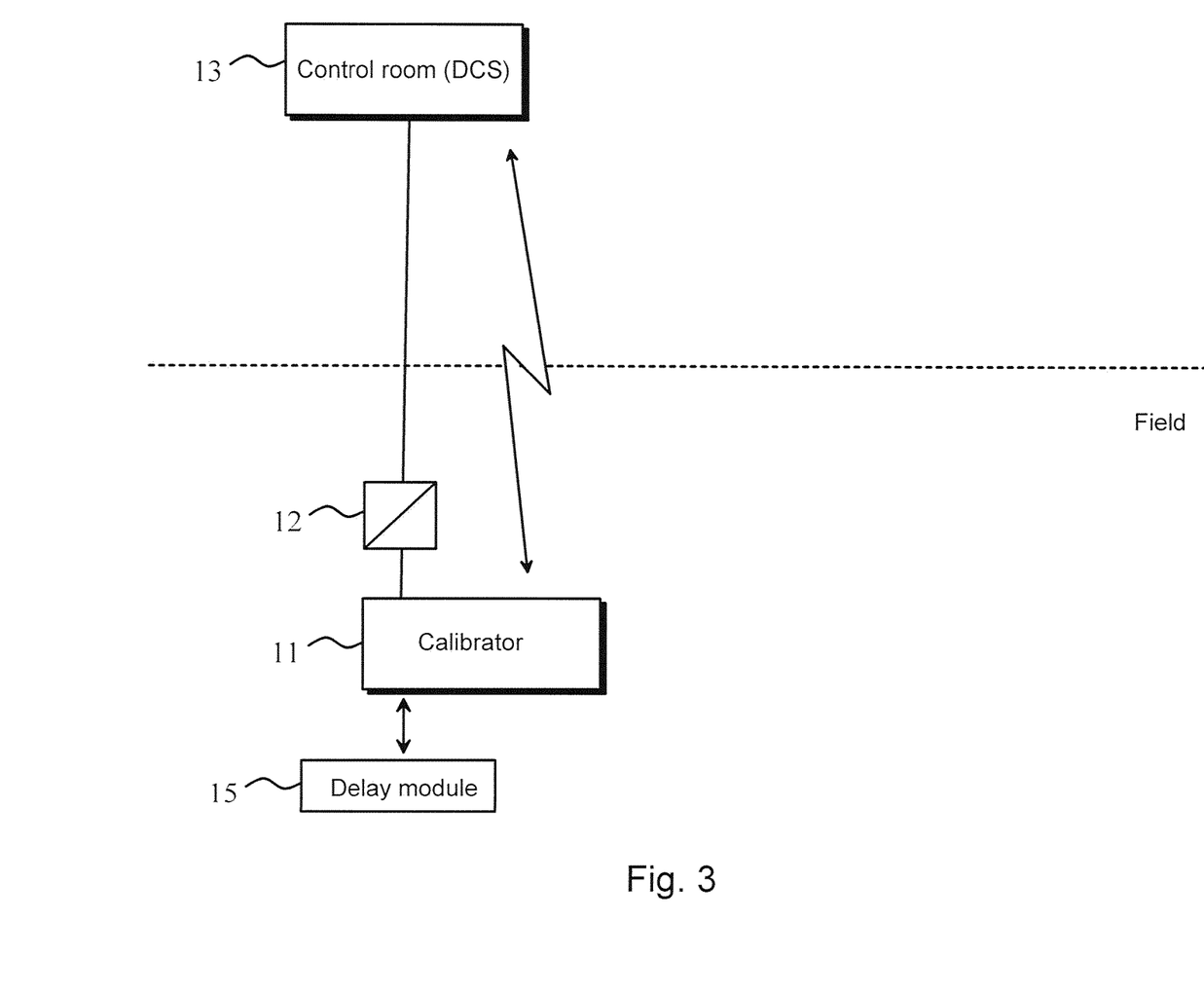
FIG. 3 shows the hardware arrangement in the third alternative embodiment of the invention, where the functionalities are integrated into the calibrator and control room.

FIG. 3 in turn shows a further third example type of the present invention. This example requires fewer "auxiliary devices", because the functionalities are integrated in the calibrator 11 and control room 13. The operational parts from the calibrator 11 to the transmitter 12, the control room 13 and the delay module 15 adding a delay function as is described in connection with FIG. 1 above. When the measurement data has passed through the measuring circuit to the control room, i.e. the DCS 13, the data needs to be transferred back to the calibrator 11. In this situation a so-called "OPC UA" ("OPC Unified Architecture") protocol functionality can be integrated into the calibrator 11. Therefore, the measurement result given by the measuring circuit can be sent directly from the control room 13 server to the calibrator 11 as a response to a "question", i.e. request sent by the calibrator 11 to the control room 13. There are many alternatives in this "direct" data transfer, such as a fixed Ethernet connection, but also for example data transfer taking place via a wireless 4G network, or data transfer taking place via a WiFi local area network connection is possible in the invention. Some other way of communicating can of course also be used. A separate dedicated server or portable separate smart device with an application is not needed in this embodiment. The calibrator's 11 own software and the wireless receiving unit handle the receiving of the measurement data. The DCS 13 also contains a transmitter unit, which is able to send data wirelessly to a calibrator 11 in the field. The received data is processed with the calibrator 11 in relation to the impulses, so that the delay module 15 adds a delay to the previously received data, whereby the data pairs can be made to correspond to each other. The numerical pair (or group of numerical pairs) received as a final result is stored in a desired format in a desired place, as has been described above. It can be a question for example of a two-column database or data spreadsheet, a graph that can be drawn in a X/Y coordinate system, or a 2*N-dimensioned matrix, where N is the number of measuring points to be calibrated.

In relation to the above in more detail, as is usually done in calibrators, it is also in the present invention possible to run several measuring points, for example a group of discrete measuring points in a desired numerical value range, through as a series-type measuring. Thus, after one measuring point's measurement has been stored, the value of the next impulse can be set from the calibrator 11 and the measurement can be repeated. After the second measurement result has been returned to the calibrator, a third value can be used for the impulse and the measuring process can be repeated. In this way a desired measuring area of a desired quantity can be run through, and for example a 2-column data spreadsheet is received as a result, which spreadsheet can be stored in the calibrator, control room server or a cloud. If the quantity to be measured is for example temperature, the changing and stabilizing of which takes time, this can be managed by waiting a sufficient amount of time from the feeding of the impulse before the measuring itself is performed. Functionally this can also be managed with the aid of the delay module 15. On the other hand, a smart calibrator is able to wait, until the signal to be measured has stabilized, and stores the result only after the stabilizing. Delays can of course be fed in the apparatus also in other places than the calibrator 15. In other words, there can be delay modules 15 in different parts of the system, in desired elements at suitable points, if necessary.

Individual characteristics and properties of the invention mentioned in the above description and the dependent claims can be combined also as ensembles comprising several individual characteristics. The above characteristics can thus be combined between different embodiments, naturally depending on the included parts of the apparatus and their functionalities.

The present invention is not limited only to the above-described examples, but many variations are possible within the scope of protection defined by the claims.

The invention claimed is:

1. A method for calibrating a measuring circuit automatically in a process to be measured, which method comprises the steps:
    connecting a calibrator to a starting point of a measuring circuit in the process to be measured;
    feeding a desired impulse from the calibrator into the starting point of the measuring circuit;
    reading a measurement result given by the measuring circuit at an end point of the measuring circuit in a control room; and
    sending the read measurement result digitally back to the calibrator;
    wherein that the method further comprises the following step:
        storing both the desired impulse and the read measurement result automatically in a desired place, so that the storing of the desired impulse is delayed, so that the sent read measurement result is stored at the same time as the desired impulse, and connected as a numerical value pair.

2. The method according to claim 1, wherein that the desired place for storing is the calibrator, a dedicated server or an external server situated in a cloud.

3. The method according to claim 1, wherein that the method further comprises the following steps:
sending the read measurement result via an OPC connection to a dedicated server; and
sending the read measurement result from the dedicated server to the calibrator by means of a Wifi, Bluetooth, 3G, 4G, 5G or Ethernet connection.

4. The method according to claim 1, wherein that the method further comprises the following steps:
sending the read measurement result via radio to a mobile phone or smart device; and
sending the read measurement result from the mobile phone or smart device to the calibrator via a Bluetooth connection.

5. The method according to claim 1, wherein that the method further comprises the following step:
sending the read measurement result directly by means of a Wifi, Bluetooth, 3G, 4G, 5G or Ethernet connection from the control room to the calibrator.

6. The method according to claim 1, wherein that the method further comprises the following step:
connecting the calibrator and control room to a network, which can be the internet.

7. The method according to claim 4, wherein that the mobile phone or smart device comprises a dedicated application for managing connections and data transfer.

8. The method according to claim 1, wherein that the method further comprises the following steps:
repeating the measurement through a desired measuring area; and
storing the results of each measuring point in the measuring area as numerical value pairs in a desired location.

9. A system for calibrating a measuring circuit automatically in a process to be measured, which system comprises:
a calibrator, which is connected to a starting point of the measuring circuit of the process to be measured, where the calibrator comprises a controller;
an impulse signal, which is arranged to be fed from the calibrator to the starting point of the measuring circuit as controlled by the controller;
an end point of the measuring circuit in a control room, where a measurement result given by the measuring circuit can be read; and
transmission means for sending the read measurement result digitally back to the calibrator;
wherein that the system further comprises:
storing means, which are arranged to store both the impulse signal and the read measurement result automatically in a desired place, so that the system further comprises a delay module for delaying the storing of the impulse signal, so that the sent read measurement result is stored at the same time as the impulse signal, and connected as a numerical value pair.

10. The system according to claim 9, wherein that the desired place for storing is the calibrator, a dedicated server or an external server situated in the cloud.

11. The system according to claim 9, wherein that the system further comprises:

a dedicated server, to which the read measurement result is sent via an OPC connection; and
additionally the dedicated server is arranged to send the read measurement result to the calibrator by means of a Wifi, Bluetooth, 3G, 4G, 5G or Ethernet connection.

12. The system according to claim 9, wherein that the system further comprises:
a mobile phone or smart device, to which the read measurement result is sent via radio; and
additionally the mobile phone or smart device is arranged to send the read measurement result to the calibrator via a Bluetooth connection.

13. The system according to claim 9, wherein that the system further comprises:
said control room, which is arranged to send the read measurement result directly to the calibrator by means of a Wifi, Bluetooth, 3G, 4G, 5G or Ethernet connection.

14. The system according to claim 9, wherein that the system further comprises:
a network connection for connecting the calibrator and control room to a network, which can be the internet.

15. The system according to claim 12, wherein that the mobile phone or smart device comprises a dedicated application for managing connections and data transfer.

16. The system according to claim 9, wherein that the system is further arranged to:
repeat the measurement through a desired measuring area; and
store the results of each measuring point in the measuring area as numerical pairs in a desired place.

17. A non-transitory computer readable medium having a computer program for calibrating a measuring circuit automatically in a process to be measured, which computer program comprises a program code, which can be run in a processor, which computer program is arranged to perform the following steps when run in the processor:
feeding a desired impulse from a calibrator into a starting point of the measuring circuit after the calibrator has manually been connected to the starting point of the measuring circuit in the process to be measured;
reading a measurement result given by the measuring circuit at an end point of the measuring circuit in a control room; and
sending the read measurement result digitally back to the calibrator;
wherein that the computer program is further arranged to perform the following step:
storing both the desired impulse and the read measurement result automatically in a desired place, so that the storing of the desired impulse is delayed, so that the sent read measurement result is stored at the same time as the desired impulse, and connected as a numerical value pair.

* * * * *

UNITED STATES PATENT AND TRADEMARK OFFICE
CERTIFICATE OF CORRECTION

| | | |
|---|---|---|
| PATENT NO. | : 11,402,244 B2 | |
| APPLICATION NO. | : 16/496116 | |
| DATED | : August 2, 2022 | |
| INVENTOR(S) | : Mathias Ray, Anders Nyman and Heikki Laurila | |

It is certified that error appears in the above-identified patent and that said Letters Patent is hereby corrected as shown below:

On the Title Page

Item (72). Third inventor, Heikki LAURILA'S residence should be PIETARSAARI.

Signed and Sealed this
Sixth Day of September, 2022

Katherine Kelly Vidal
*Director of the United States Patent and Trademark Office*